(12) United States Patent
Ramirez

(10) Patent No.: US 11,267,521 B1
(45) Date of Patent: Mar. 8, 2022

(54) POWERED TRAILER UNIT

(71) Applicant: Manuel Ramirez, Odessa, TX (US)

(72) Inventor: Manuel Ramirez, Odessa, TX (US)

( * ) Notice: Subject to any disclaimer, the term of this patent is extended or adjusted under 35 U.S.C. 154(b) by 0 days.

(21) Appl. No.: 17/035,618

(22) Filed: Sep. 28, 2020

(51) Int. Cl.
*B62D 63/06* (2006.01)
*B62D 63/08* (2006.01)

(52) U.S. Cl.
CPC .......... *B62D 63/061* (2013.01); *B62D 63/08* (2013.01)

(58) Field of Classification Search
CPC .............................. B62D 63/061; B62D 63/08
See application file for complete search history.

(56) References Cited

U.S. PATENT DOCUMENTS

| | | | | |
|---|---|---|---|---|
| 2,090,099 A | * | 8/1937 | Bittorf | E05B 65/0021 160/191 |
| 2,606,677 A | * | 8/1952 | Snedeger | B60P 1/006 414/515 |
| 3,272,358 A | * | 9/1966 | Thompson | B60P 1/36 414/520 |
| 3,498,482 A | * | 3/1970 | Milburn | B60P 1/38 414/510 |
| 3,722,717 A | * | 3/1973 | Stryczek | B60P 1/365 414/521 |
| 3,888,366 A | * | 6/1975 | Prahst | B60P 1/38 414/527 |
| 3,998,343 A | * | 12/1976 | Fors | B60P 1/006 414/501 |
| 4,015,727 A | * | 4/1977 | Rezac | B60P 1/006 414/521 |
| 4,082,196 A | * | 4/1978 | Lutz | B60P 1/365 198/817 |
| 4,111,318 A | * | 9/1978 | Lutz | B60P 1/006 198/817 |
| 4,162,735 A | * | 7/1979 | Lewis | B60P 1/006 414/514 |
| 4,431,360 A | * | 2/1984 | Maeno | B65G 67/04 414/294 |
| 4,518,303 A | * | 5/1985 | Moser | B60P 1/38 198/750.1 |
| 4,664,583 A | * | 5/1987 | Gust | B65G 65/42 198/841 |
| 4,747,747 A | * | 5/1988 | Fusco | B60P 1/365 198/834 |
| 4,842,471 A | * | 6/1989 | Hodgetts | B60P 1/365 414/514 |
| 5,143,508 A | * | 9/1992 | Lutz | B60P 1/006 198/747 |
| 5,314,290 A | * | 5/1994 | Lutz | B65D 88/60 414/509 |
| 6,033,179 A | * | 3/2000 | Abbott | B60P 1/00 414/527 |

(Continued)

*Primary Examiner* — Saul Rodriguez
*Assistant Examiner* — Ashley K Romano
(74) *Attorney, Agent, or Firm* — Rao DeBoer Osterrieder, PLLC; John M. DeBoer

(57) ABSTRACT

A powered trailer unit that includes a support frame, and a bed disposed on the support frame. The frame has a first side, a second side opposite the first side, a proximate end and a distal end. The first side has a first guide rail, with the movable wall movingly engaged therewith. There is a mover operatively engaged with the movable wall, the movable wall configured to be moved back and forth along the unit by operation of the mover.

15 Claims, 9 Drawing Sheets

(56) References Cited

U.S. PATENT DOCUMENTS

| | | | | |
|---|---|---|---|---|
| 6,837,668 B1* | 1/2005 | Brown | B60P 1/365 | |
| | | | 414/510 | |
| 7,147,423 B2* | 12/2006 | Golden | B60P 1/006 | |
| | | | 414/510 | |
| 9,630,545 B1* | 4/2017 | Corrigan | B60P 1/44 | |
| 10,308,158 B2* | 6/2019 | Quenzi | B60P 1/365 | |
| 2006/0145036 A1* | 7/2006 | Jones | A47B 13/023 | |
| | | | 248/188.5 | |
| 2011/0142585 A1* | 6/2011 | Stewart | B60P 1/365 | |
| | | | 414/527 | |
| 2014/0003889 A1* | 1/2014 | Van Bentzinger | A01D 41/1278 | |
| | | | 414/111 | |
| 2017/0057392 A1* | 3/2017 | Killgour | B60P 3/122 | |

* cited by examiner

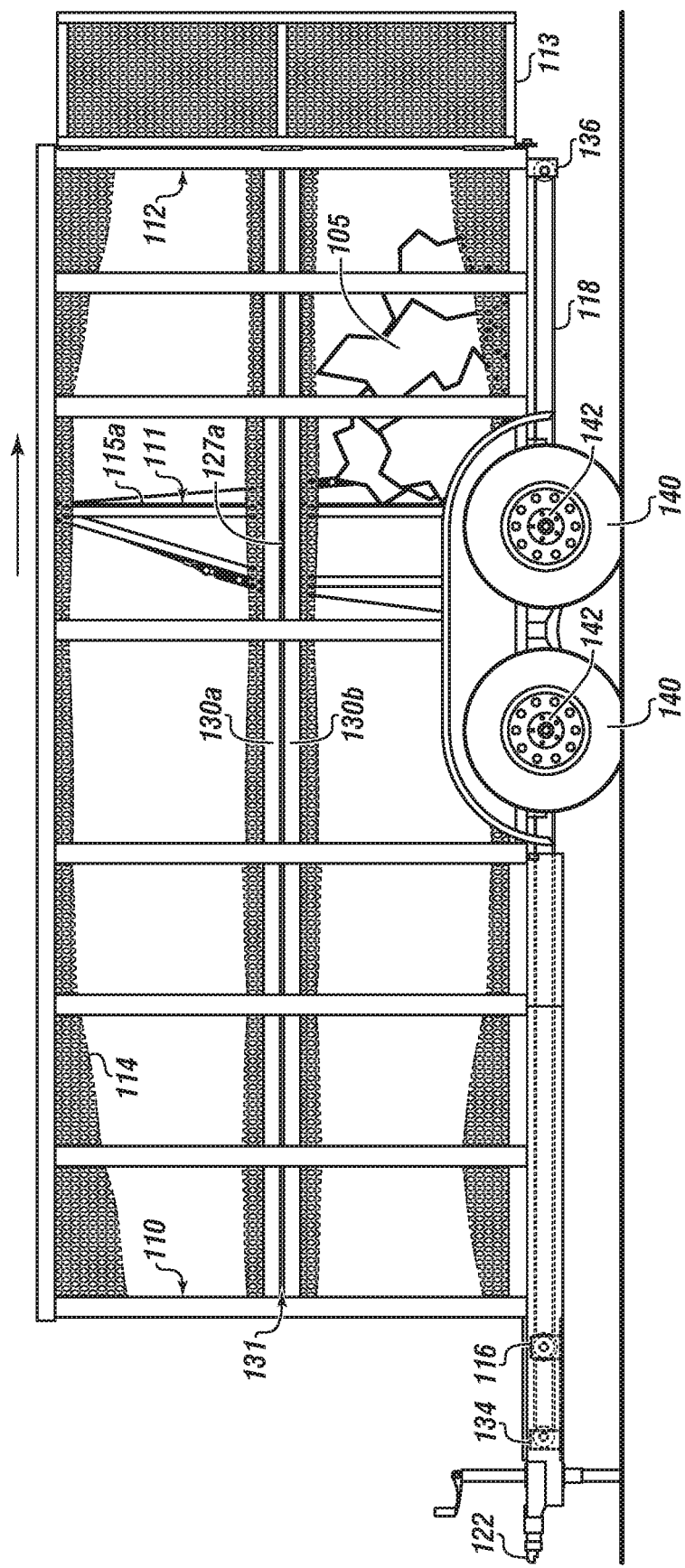

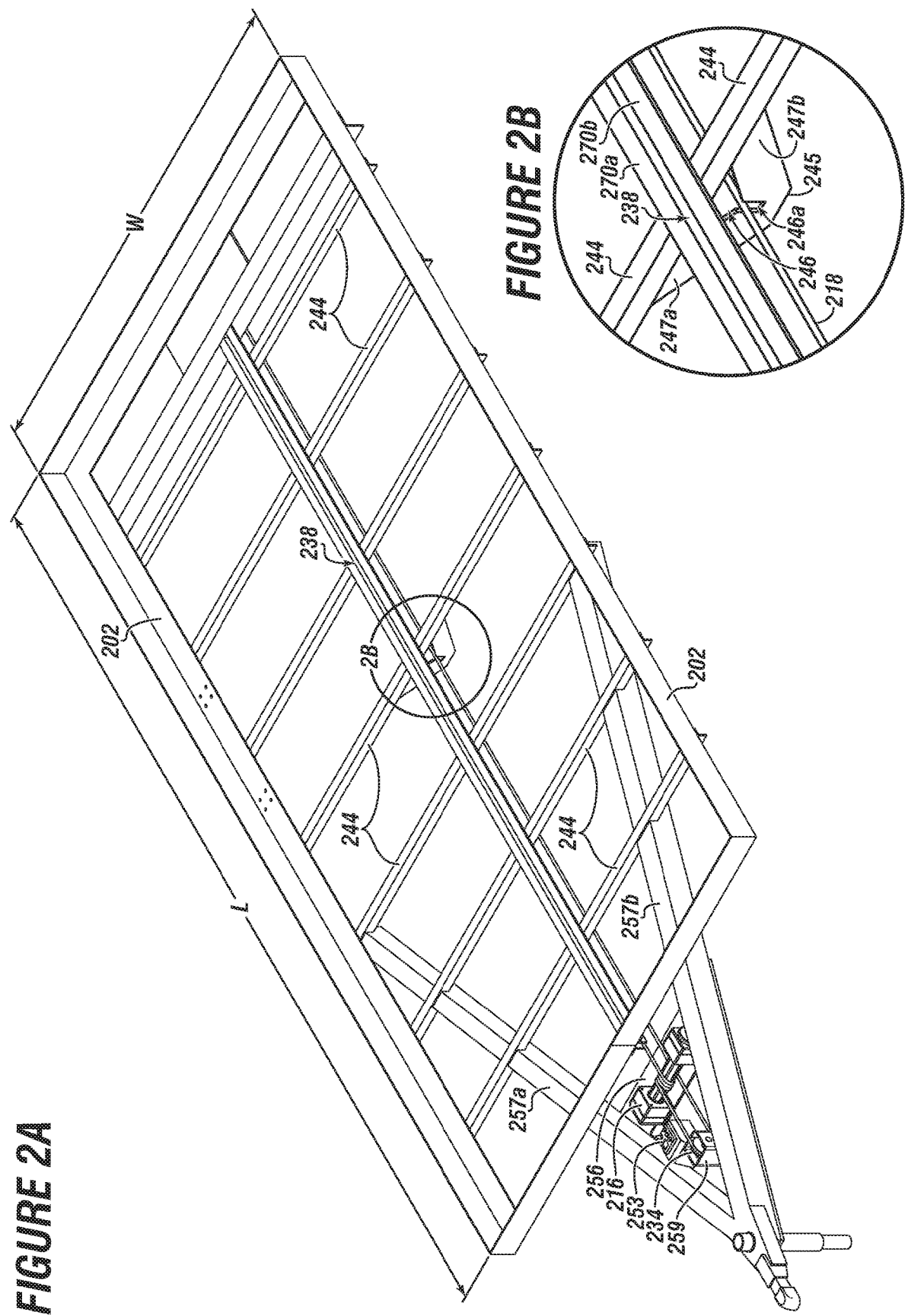

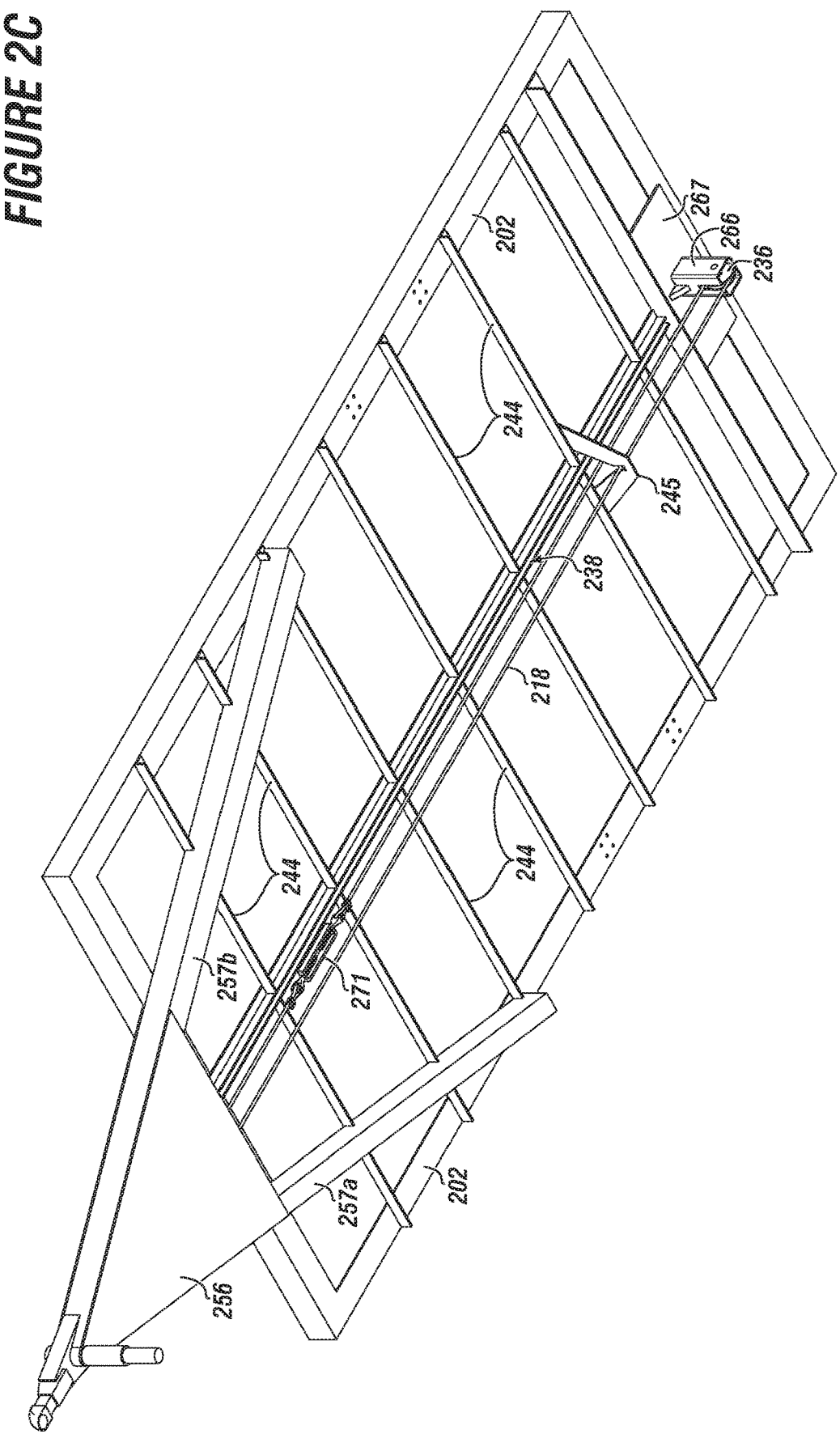

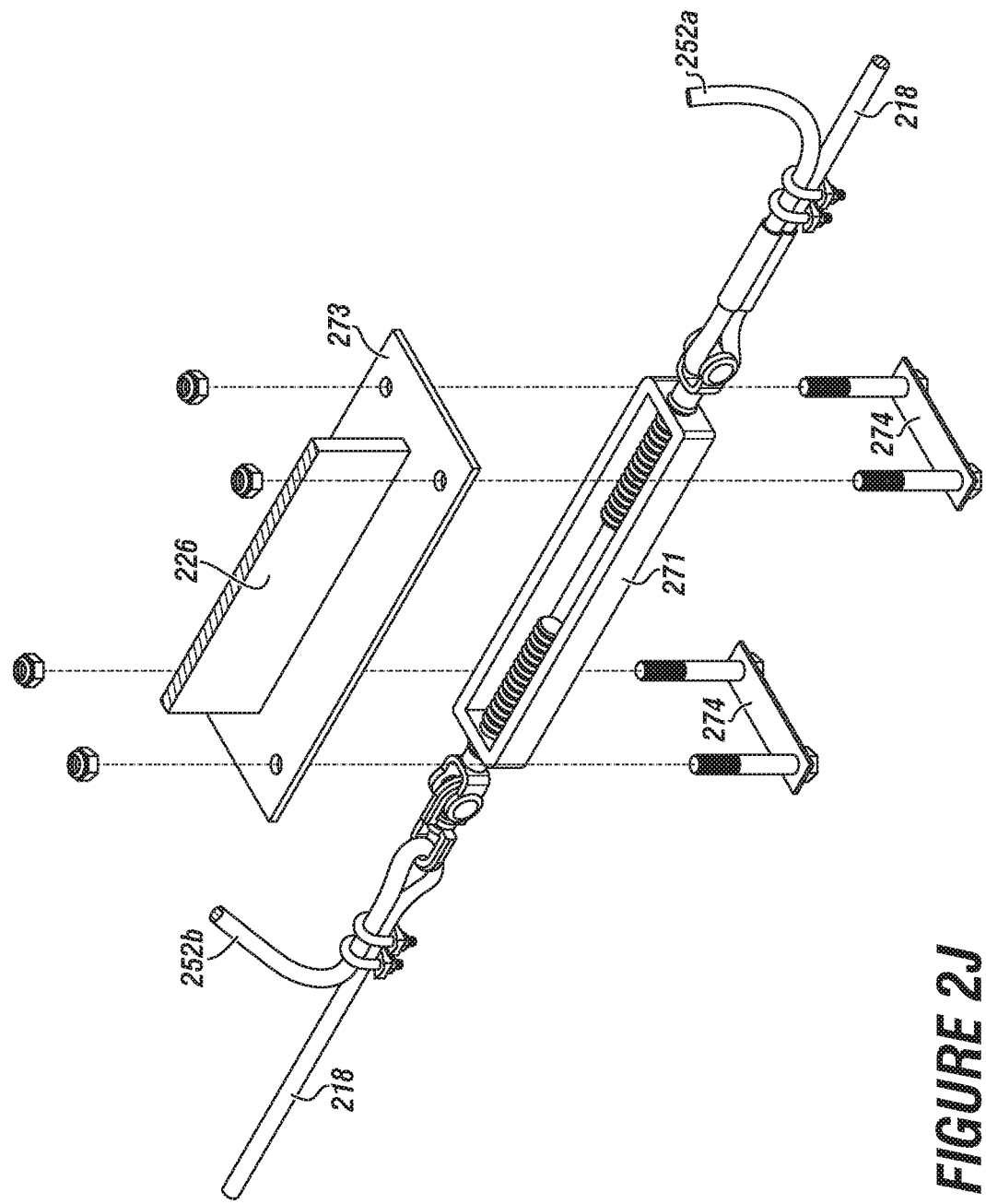

POWERED TRAILER UNIT

BACKGROUND

Field of the Disclosure

This disclosure generally pertains to a powered trailer, with related methods and systems, and the like used for the handling, transport, disposal, etc. of bulk materials. More specifically, the disclosure relates to a trailer able to rapidly remove bulk materials therefrom.

Background of the Disclosure

Trailers are often provided for a specific purpose. For example, trailers are designed for hauling cattle or livestock, enclosed trailers are used to protect internal contents during shipping, such as packages, mail etc., flat bed trailers are used for hauling timber or other large items, and a variety of other trailer designs. Trailers designed for one specific purpose are often particularly useful for that specific purpose, but can also be useful for other purposes as well. Some trailers are designed to be relatively small and light weight such that they can be moved by a person without the use of a motorized vehicle. These trailers can be pushed or pulled to various locations for positioning and for moving the trailer as desired. There are also trailers designed for use with non-motorized vehicles, such as bicycles.

In any number of industries, and even in the personal or home use, there is a need for a trailer suitable for transport and/or disposal of bulk materials. Bulk materials can include, for example, lumber, trash, grass clippings, pallets, shingles, storage containers, furniture, debris, tree stumps/branches, dirt, mulch, boulders/rocks, and just about anything else.

Conventional tractor-trailer arrangements are inadequate to haul large loads of materials that have to then be off-loaded, such as at a disposal site. To remove bulk materials from a trailer either requires expensive, elaborate trailer-lifting pistons that allow gravity disposal, or time-consuming manual labor.

A need exists to expedite bulk material removal from trailers in a safe, efficient, and cost-effective manner.

The ability to increase efficiency and save operational time and expense while increasing safety leads to considerable competition in the marketplace. Achieving any ability to save time, or ultimately cost, while increasing safety leads to an immediate competitive advantage.

SUMMARY

Embodiments of the disclosure pertain to a powered trailer unit for use in transport of bulk materials that may include one or more of the following: a support frame; a bed disposed on and/or being part of the support frame; a barrier disposed around and/or being part of a perimeter of the support frame. The barrier may include: a first side, a second side opposite the first side, a gate side, and a movable wall. There may be a first guide rail positioned on the first side. The movable wall may be movingly engaged therewith. There may be a mover operatively engaged with the movable wall. In aspects, the movable wall may be configured to be moved back and forth along the unit by operation of the mover.

The trailer unit may include a longitudinal slot disposed within the bed. The movable wall may include a lower skate movingly disposed within the longitudinal slot. The lower skate may have a first skate portion disposed above the bed, and a second skate portion disposed below the bed.

The trailer unit may include a powered winch that is part of a winch assembly. The winch assembly may include one or more of the following: a first pulley, which may be disposed near a proximate end of the support frame; a second pulley, which may be disposed near a distal end of the support frame. The second pulley may be disposed underneath the frame. The assembly may include a cable movingly engaged with one or more of: the powered winch, the first pulley, the second pulley, and the second skate portion.

The movable wall may include a front vertical portion, and a backup portion coupled therewith. There may be a first tension member engaged with the front vertical portion. There may be a second tension member is engaged with the backup portion.

In aspects, cable may be wrapped around a spool of the powered winch in a single layer comprising 2 to 8 windings in a manner that forms a cable wrap layer. In operation of the unit, the cable wrap layer may move laterally along the spool as the movable wall moves from a first position to a second position.

The first pulley may be movably disposed around a first pulley shaft that that may be coupled with a first pulley housing. There may be a respective shaft springs disposed around the shaft on each side of the first pulley.

Other embodiments pertain to a powered trailer unit for use in transport of bulk materials that may include one or more of the following: a support frame; a bed or floor disposed on or being part of the support frame; a first side; a second side opposite the first side; a gate side near a distal end or part of the support frame; a movable wall near a proximate end of the support frame when the movable wall is in a first position.

There may be a first guide rail positioned on the first side. The movable wall may be movingly engaged with the first guide rail. There may be a second guide rail positioned on the second side. The movable wall may be movingly engaged with the second guide rail.

There may be a winch assembly operatively engaged with the movable wall. The winch assembly may include one or more of the following: a powered winch; a first pulley; a second pulley. There may be a cable movingly engaged with any the powered winch, the first pulley, the second pulley, and the movable wall.

The movable wall may be configured to be moved back and forth between the first position and a second position by operation of the winch assembly. The second position may be any position along a length of the unit that does not include the first position.

The bed comprises a longitudinal slot, wherein the movable wall comprises a lower skate movingly disposed within the longitudinal slot, the lower skate having a first skate portion disposed above the bed, and a second skate portion disposed below the bed, and wherein the cable is coupled with the second skate portion.

The movable wall may include one or more of: a front vertical portion, and/or a backup portion coupled therewith. There may be a first tension member coupled with the front vertical portion and the cable. There may be a second tension member coupled with the backup portion and the cable. Either of the tension members may be separate from, but coupled with, the cable.

The first pulley may be disposed on a first support plate near the proximate end. There may be a second pulley disposed on and underneath a second support plate near a distal end. The cable may wrap around a spool of the powered winch in a single cable wrap layer comprising 2 to 8 windings. The cable wrap layer may move laterally along the spool as the movable wall moves from the first position to the second position.

The first pulley may be movably disposed around a first pulley shaft that is coupled with a first pulley housing. There may be respective shaft springs disposed around the shaft on each side of the first pulley.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein:

FIG. 1B shows a side view of the powered trailer unit of FIG. 1A having a movable wall in a second position according to embodiments of the disclosure;

FIG. 2A shows a frontward isometric view of a support frame for a powered trailer unit according to embodiments of the disclosure;

FIG. 2B shows a zoom-in view the support frame of FIG. 2A having an underside support rib according to embodiments of the disclosure;

FIG. 2C shows a frontward underside isometric view of the support frame of FIG. 2A according to embodiments of the disclosure;

FIG. 2J shows a partial component breakout view of a coupler usable to engage a cable with a movable wall according to embodiments of the disclosure.

DETAILED DESCRIPTION

Figure 1A:
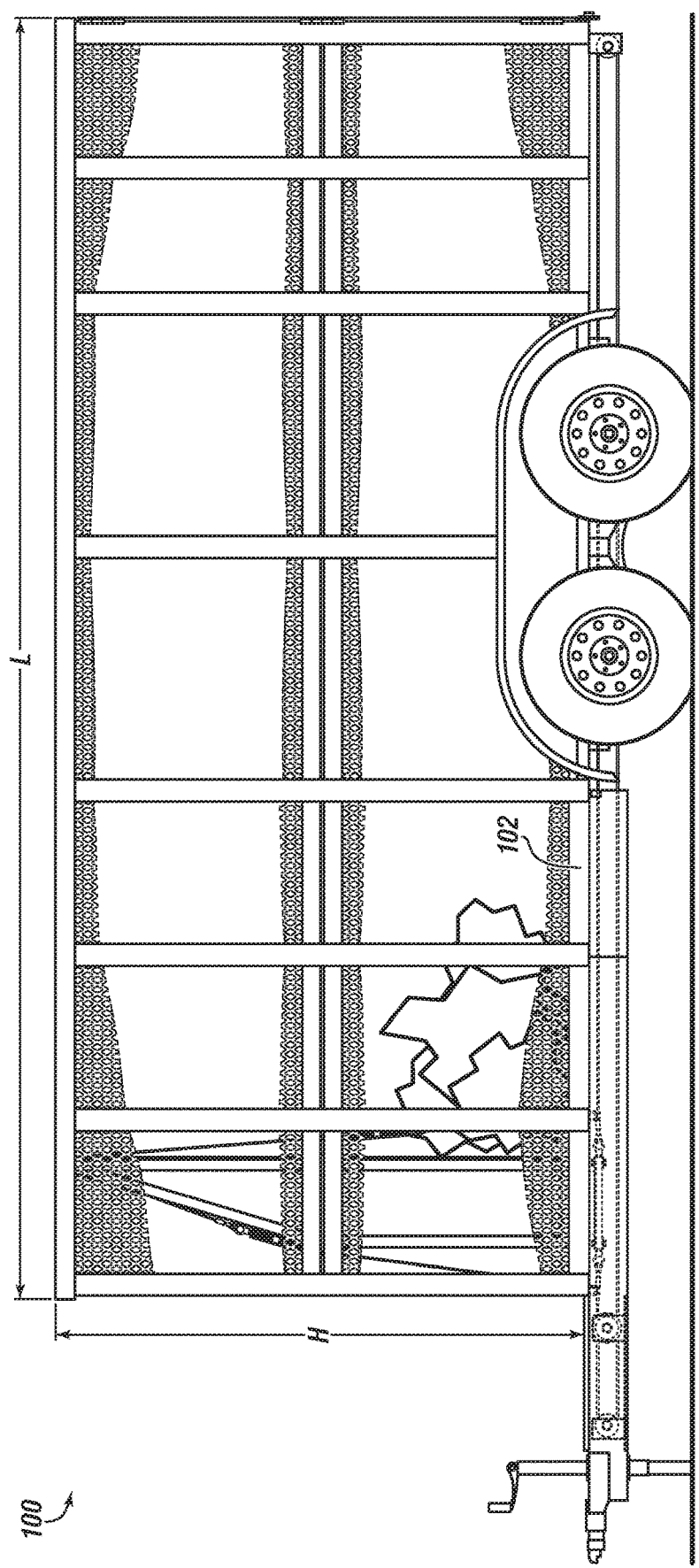
FIG. 1A shows a side view of a powered trailer unit having a movable wall in a first position according to embodiments of the disclosure.

Regardless of whether presently claimed herein or in another application related to or from this application, herein disclosed are novel apparatuses, units, systems, and methods that pertain to improved handling of tubulars, details of which are described herein.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted to existing machines and systems.

Various equipment may be in fluid communication directly or indirectly with other equipment. Fluid communication may occur via one or more transfer lines and respective connectors, couplings, valving, piping, and so forth. Fluid movers, such as pumps, may be utilized as would be apparent to one of skill in the art.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000. it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure. Numerical ranges are provided within this disclosure for, among other things, the relative amount of reactants, surfactants, catalysts, etc. by itself or in a mixture or mass, and various temperature and other process parameters.

Terms

The term "connected" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth. Any use of any form of the terms "connect", "engage", "couple", "attach", "mount", etc. or any other term describing an interaction between elements is not meant to limit the interaction to direct interaction between the elements and may also include indirect interaction between the elements described.

The term "pipe", "conduit", "line", "tubular", or the like as used herein may refer to any fluid transmission means, and may (but need not) be tubular in nature.

The term "composition" or "composition of matter" as used herein may refer to one or more ingredients, components, constituents, etc. that make up a material (or material of construction). Composition may refer to a flow stream of one or more chemical components.

The term "skid" as used herein may refer to one or more pieces of equipment operable together for a particular purpose. For example, a 'catwalk-power swivel skid' may refer to one or more pieces of equipment operable together to provide or facilitate presenting a tubular to a derrick. A skid may be mobile, portable, or fixed. Although 'skid' may refer to a modular arrangement of equipment, as used herein may be mentioned merely for a matter of brevity and simple reference, with no limitation meant. Thus, skid may be comparable or analogous to zone, system, subsystem, and so forth.

The term "skid mounted" as used herein may refer to one or more pieces operable together for a particular purpose that may be associated with a frame- or skid-type structure. Such a structure may be portable or fixed.

The term "engine" as used herein may refer to a machine with moving parts that converts power into motion, such as rotary motion. The engine may be powered by a source, such as internal combustion.

The term "motor" as used herein may be analogous to engine. The motor may be powered by a source, such as electricity, pneumatic, or hydraulic.

The term "utility fluid" as used herein may refer to a fluid used in connection with the operation of a heat generating device, such as a lubricant or water. The utility fluid may be for heating, cooling, lubricating, or other type of utility. 'Utility fluid' may also be referred to and interchangeable with 'service fluid' or comparable.

The term "mounted" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth.

The term "winch" as used herein may refer to a mechanical device used to pull (in one or more directions) or otherwise adjust the tension of a rope or wire rope (also called "cable" or "wire cable"). In its simplest form, a winch may be a spool (or drum) rotatable by a crank.

Referring now to FIGS. 1A-1B together, a side view of a powered trailer in a first position and a side view of the powered trailer of FIG. 1A in a second position, respectively, illustrative of embodiments disclosed herein, are shown.

FIGS. 1A and 1B together show a trailer unit 100. In the general sense, trailer unit 100 may be contemplated as a mobile trailer unit configured for coupling to a mover, such as a truck, cab, care, and the like. However, the unit 100 is not meant to be limited, and in other aspects may be integral with a mover, stationary, part of a larger bulk materials handler, etc. The trailer unit 100 may be skid mounted or otherwise part of a skid.

The trailer unit 100 may be suitable to haul any number of items, materials, containers, items, etc., for brevity referred to herein as bulk material 105. The bulk material 105 may be debris, trash, lumber, grass clippings, bags, storage containers, dirt, auto parts, livestock, or any other type of material capable of being moved from one location to another, as well as combinations of different materials. The size and the capacity of the trailer unit 100 may be configured to accommodate the type of material 105. Thus, a smaller unit 100 may be desired for smaller residential purposes, while a larger unit 100 may be desired for larger industrial purposes. Although not meant to be limited, the trailer unit 100 may have a length L, a width W, and a height H.

The trailer unit 100 may include a support frame 102. The support frame 102 may include various members coupled together (such as via welding), which may be in a manner suitable to provide strength, rigidity, and durability. The support members may be oriented horizontal, vertical, diagonally, etc. with respect to other members. There may be a bed or floor 104 disposed on the support frame, to which the bulk material 105 may be positioned thereon.

The bed 104 may be a relatively flat surface, and thus provide a relatively flat surface for the trailer unit 100. A flat surface may facilitate loading and unloading of the trailer 100. In an embodiment, the bed 104 may be a single piece or sheet of material. In other embodiments, the bed 104 may include a plurality of members. For example, a plurality of elongated members (such as 2×4's) may be positioned proximate each other, one or more of the members spanning the length L of the frame 102. The bed 104 may be made of a durable material, such as metal, wood, and the like. The bed 104 may have a general horizontal orientation. 'Horizontal' in this sense is not meant to mean exact geometrical precision with respect to an axis; instead, when viewed by an ordinary observer, the bed 104 may be similar in orientation to the surface to which the unit 100 is resting on, such as the ground.

Although the trailer unit 100 may generally be rectangular prism in shape, other shapes are possible. As shown here, the unit 100 may have a first side 106 and a second side 108. The sides 106, 108 may span the approximate length L of the unit 100. Either of the sides 106, 108 may be a single integral piece, or have a multi-piece configuration. For example, the sides 106, 108 may be a combination of members (e.g., horizontal and vertical) coupled together, with a mesh, fencing, or other suitable siding 114 (shown only in part here) disposed or otherwise mounted thereon.

The trailer unit 100 may also include a proximate end 110, and may also include a distal end 112. The proximate end 110 may be the portion of the trailer unit 100 that would be closest to a vehicle when the trailer 100 is connected to a vehicle. As such, there may be a hitch 122, which may be located or positioned on or near the proximate end 110.

The distal end 112 may be the portion of the trailer unit 100 that provides access for adding/removing materials 105. The distal end 112 may have a movable tail gate 113. The tail gate 113 may open sideways, like a door (or two doors opening to each side), downward, like a ramp (as shown in 1B), upward like a hatch, and combinations thereof.

As such, the tail gate 113 may be hingedly connected to the frame 102. The tail gate 113 may open to a point where the back end of the tail gate 113 touches the ground and makes a ramp such that one can slide or roll up materials on and off the trailer 100. The tail gate 113 may include connectors for securing the tail gate 113 in a closed position (see FIG. 1A) as desired. In aspects, the tail gate 113 may be secured in a closed position using other devices, such as a chain, a hinged rail, or a bar.

The proximate end 110 may enclose or be part of a movable wall 111. The term 'powered' trailer refers to the notion that a portion of the trailer unit 100 may be powered or operable via some kind of energy. The energy may be from a power source or otherwise mechanical in nature; however, other types of power, such as human manpower, may be contemplated within the meaning of the term.

The movable wall 111 may have a width and height approximate to that of the unit 100, albeit with sufficient clearance so that the wall 111 may traverse back and forth along the unit length L (see movement arrow, FIG. 1B). The movable wall 111 may be of suitable strength and durability to withstand forces incurred from moving bulk materials 105.

To facilitate movement of the wall 111, the wall may be configured with a first side fin 127a. The first side fin 127a may be disposed on a first wall side 113. Although not shown here, there may be on or more additional side fins. For example, a second side fin may be disposed on the second side 108.

The first side fin 127a may be configured to engage in a first guide member or rail 130a. The first guide rail 130a may be one or more horizontal members configured or otherwise disposed on the first side 106. The first guide rail 130a may have any length desired to coincide with however much distance is desired for the wall 111 to move. In aspects, the guide rail 130a may be about as long as the length L of the unit 100. The guide rail 130a may be one or more members arranged together in a way that forms a guide slot 131a. The first side fin 127a may be configured to fit within and move therein. The movement of the first side fin 127a may be powered or passive. That is, the fin 127a may simply movingly engage the rail 130a as the wall 111 moves, or on the other hand, the fin 127a may be moved via a power source, such as a pulley, rollers, winch, or the like, which may be part of the rail 130a.

As shown in FIG. 1B, the movement of the wall 111 may be controlled by a powered assembly or system, such as a winch assembly 119. Other conveyance or movement mechanisms are possible, such as powered rollers, belts, and the like. As shown here, the winch assembly 119 may include a powered winch 116. The powered winch 116 may have a rope, cable, chain, etc. 118 wrapped around and engaged therewith. As one of skill would appreciate, in the general operation of winch 116, as the winch rotates, the cable 118 may be moved. The powered winch 116 may rotate in either direction. As such, the movement of the wall 111 may be bi-directional.

The cable 118 may wrap around one or more pulleys or rollers. As shown here, the cable 118 may form a loop by wrapping around a first pulley or roller 134, as well as a second pulley or roller 136. The first pulley 114 may be disposed on or in the vicinity of the proximate end 110. The second pulley 136 may be disposed on or in the vicinity of the distal end 112.

There may be a coupler in the form of a lower fin or skate 126. The lower fin 126 may (essentially) couple the powered motion of the winch 116 to the wall 111. As such, the cable 118 may be coupled with the lower fin 126, and the lower fin 126 may be coupled to the wall 111, such as to a bottom 117 of the wall 111. To facilitate movement of the wall 111 and the lower fin 126, there may be a slot (or rail, cap, clearance, etc.) 138 disposed within the floor 104.

There may be a person or operator 120 in the vicinity of the trailer unit 100 in order to control operation of the winch assembly 119. The operator 120 may activate an on/off switch that powers the assembly 119, and subsequently results in movement of the wall. For example, when materials 105 are disposed in the unit 100 and are ready for removal, the operator 120 may turn the winch assembly on, and observe the wall 111 move and clear the materials 105 from the unit. The control feature of the assembly 119 may also include a 'reverse' capability whereby the wall 111 may be moved in the opposite direction. The wall 111 may be also be moved manually. Although not shown here, there may be a clutch feature that allows easier manual movement of the wall 111.

The operator 120 may control operation of the winch assembly 119 at the winch 116, or via a control panel located elsewhere. The operation may be remote, such as wireless or infrared. The operator 120 may control operation through a mobile application, and thus may use a cell phone, tablet, PC, or other comparable device. It is within the scope of embodiments herein that the operator 120 may be at another location (e.g., miles away), and yet still be able to operate the trailer unit. The remote operation may be facilitated by video link.

Next series figures . . . .

Referring now to FIGS. 2A-2J together, a frontward isometric view of a support frame for a powered trailer unit, a zoom-in view the support frame having an underside support rib, a frontward underside isometric view of the support frame, a frontward isometric view of a movable wall, a partial isometric view of a movable wall engaged with a side of a powered trailer unit, a partial isometric view of a winch assembly for a powered trailer unit, a downward view of a pulley disposed in a pulley housing, a downward view of a pulley disposed around a pulley shaft, an isometric view of part of a cable engaged with a pulley, and a partial component breakout view of a coupler usable to engage a cable with a movable wall, respectively, illustrative of embodiments disclosed herein, are shown.

FIGS. 2A to 2J together or separately show various aspects for a trailer unit 200. In the general sense, trailer unit 200 may be contemplated as a mobile trailer unit configured for coupling to a motorized vehicle, such as a truck, cab, care, and the like. However, the unit 200 is not meant to be limited, and in other aspects may be integral with a vehicle, stationary, part of a larger bulk materials handler, and the like. The trailer unit 200 may be skid mounted or otherwise part of a skid.

The trailer unit 200 may be operated or otherwise used in a manner to provide, control, facilitate, etc. handling, transport, and disposal of one or more types of bulk materials. While it need not be exactly the same, the unit 200 may be assembled, run, and operated as described herein and in other embodiments (such as for unit 100, and so forth), and as otherwise understood to one of skill in the art.

Components of the unit 200 may be arranged by, disposed on, or otherwise coupled with a trailer or support frame 202, and as otherwise understood to one of skill in the art. Thus, the unit 202 may be comparable or identical in aspects, function, operation, components, etc. as that of other unit embodiments disclosed herein (e.g., 100). Similarities may not be discussed for the sake of brevity.

Associated or auxiliary equipment including automation, controllers, piping, hosing, valves, wiring, nozzles, pumps, gearing, tanks, etc. may be shown only in part, or may not be shown or described, as one of skill in the art would have an understanding of coupling the components of the unit 200 for operation thereof. For example, a battery of a vehicle may be in operable communication, directly or indirectly, with one or more components of the unit 200 (such as a controller or power supply 253). All components of the unit 200 requiring power or automation may be provided with wiring, tubing, piping, etc. in order to be operable therefore. The unit 200 may have cathodic protection where desired.

The trailer unit 200 may be suitable to haul any number of items, materials, containers, items, etc., for brevity referred to herein as a bulk material 205. The size and the capacity of the trailer unit 200 may be configured to accommodate the type of material 205. Thus, a smaller unit 200 may be desired for smaller residential purposes, while a larger unit 200 may be desired for larger industrial purposes. Although not meant to be limited, the trailer unit 200 may have a length L, a width W, and a height H. For example, the length may be about 12 feet to about 20 feet, and each of the width and height may be about 3 feet to about 8 feet, respectively.

The trailer unit 200 may include a support frame 202. The support frame 202 may include various members (e.g., 244, 272, etc.) coupled together (such as via welding), which may be in a manner suitable to provide strength, rigidity, and durability. There may be a bed or floor 204 disposed on the support frame, to which the bulk material 205 may be positioned thereon.

The bed 204 may be a relatively flat surface, and thus provide a relatively flat surface for the trailer unit 200. A flat surface may facilitate loading and unloading of the trailer 200. In an embodiment, the bed 204 may be a single piece or sheet of material. The bed 204 may include two portions or halves having a slot 231 therebetween. In other embodiments, the bed 204 may include a plurality of members. For example, a plurality of elongated members may be positioned proximate each other, one or more of the members spanning the length L of the frame 202. The slot 231 in the bed may correspond to a slot within the frame 202. The slot in the frame may be the result of positioning to longitudinal members (such as L-bars) next to each other in sufficient manner to leave a clearance.

A typical trailer bed may have underside support members spanning horizontally along the length and width of the bed in order to give support against loads placed thereon; however, in the presence of the slot 231, the horizontal width members 244 *a, b* are not able to provide comparable support as a result of the presence of a discontinuity therebetween. As such, unit 200 may include one or more support ribs 245 configured to provide support to the members 244 *a, b*.

The support rib 245 may have a first rib portion 247*a* coupled with the first horizontal width member 244*a*. The support rib 245 may have a second rib portion 247*b* coupled with the second horizontal width member 244*b*. The support rib 245 may be configured to provide a first clearance 246. The support rib 245 may be configured to provide an additional or second clearance 246*a*. The use of the support rib 245 provides the trailer unit 200 with a pseudo horizontal support member that extends the underside width of the bed 204, yet still provides adequate clearance for the skate 226 and cable 218.

The bed 204 may be made of a durable material, such as metal, wood, and the like. The bed 204 may have a general horizontal orientation. 'Horizontal' in this sense is not meant to mean exact geometrical precision with respect to an axis; instead, when viewed by an ordinary observer, the bed 204 may be similar in orientation to the surface to which the unit 200 is resting on, such as the ground.

The unit 200 may have a complete or partial surrounding perimeter. For example, there may be a first side 206 and a second side 206, and ends 211 and 213. The sides 206, 208 may span the approximate length L of the unit 200. Either of the sides 206, 208 may be a single integral piece, or have a multi-piece configuration. For example, the sides 206, 208 may be a combination of members (e.g., horizontal and vertical) coupled together, with a mesh, expanded metal, caging, fencing, or other suitable siding 214 (shown only in part here) disposed or otherwise mounted thereon. The siding 214 may be internal or external to the frame 202.

The trailer unit 200 may also include a proximate end 210, and may also include a distal end 212. The proximate end 210 may be the portion of the trailer unit 200 that would be closest to a vehicle when the trailer 200 is connected to a vehicle. As such, there may be a hitch 222, which may be located or positioned on or near the proximate end 210.

The distal end 212 may be the portion of the trailer unit 200 that provides access for adding/removing materials 205. The distal end 212 may have a movable tail gate 213. The tail gate 213 may open sideways, like a door, downward, like a ramp (as shown in 1B), upward like a hatch, and combinations thereof.

As such, the tail gate 213 may be hingedly connected to the frame 202. The tail gate 213 may open to a point where the back end of the tail gate 213 touches the ground and makes a ramp such that one can slide or roll up materials on and off the trailer 200. The tail gate 213 may include connectors for securing the tail gate 213 in a closed position (see FIG. 1A) as desired. In aspects, the tail gate 213 may be secured in a closed position using other devices, such as a chain, a hinged rail, or a bar. The tail gate 213 may have a left side portion and a right side portion that open outwardly to the respective left and right sides of the unit 200.

The proximate end 210 may enclose or be part of a movable wall 211. In aspects, the movable wall 211 may have a first position whereby the movable wall may be near or close to the proximate end 210. The term 'powered' trailer refers to the notion that a portion of the trailer unit 200, such as the movable wall 211, may be powered or operable via some kind of energy. The energy may be from a power source or otherwise mechanical in nature, directly or indirectly; however, other types of power, such as human manpower, may be contemplated within the meaning of the term.

The movable wall 211 may have a width and height approximate to that of the unit 200, albeit with sufficient clearance so that the wall 211 may traverse back and forth along the unit length L (see movement arrow, FIG. 1B). The movable wall 211 may be of suitable strength and durability to withstand forces incurred from moving bulk materials 205.

The movable wall 211 may have a vertical portion 248 configured of suitable strength and durability to withstand forces incurred by moving heavy loads of materials 205. To provide additional capability, the vertical portion 248 may be reinforced with a backup portion 249. The portions 248, 249 may be joined together via one or more wall beams 251. There may be a clearance 250 between the portions 248, 249. The lower fin 226 may couple between the portions 248, 249. The lower fin 226 may fit within and extend through the slot 231.

To facilitate movement of the wall 211, the wall may be configured with a first side fin 227*a*. The first side fin 227*a* may be disposed on a first wall side 215*a*. Although not shown here, there may be on or more additional side fins. For example, a second side fin may be disposed on the second side 208.

The first side fin 227a may be configured to engage in a first guide member or rail 230a. The first guide rail 230a may be one or more members (such as elongated and oriented horizontal) configured or otherwise disposed on the first side 206. The first guide rail 230a may have any length desired to coincide with however much distance is desired for the wall 211 to move. In aspects, the guide rail 230a may be about as long as the length L of the unit 200. The guide rail 230a may be one or more members arranged together in a way that forms a guide slot 231a. The first side fin 227a may be configured to engage therewith, fit within, move therein, etc. The movement of the first side fin 227a may be powered or passive. That is, the fin 227a may simply movingly engage the rail 230a as the wall 211 moves, or on the other hand, the fin 227a may be moved via a power source, such as a pulley, rollers, winch, or the like. In aspects, the rail 230a may have a powered portion. One or more of these features may be part of the guide rail 230a or a second guide rail (230b).

To provide stability to the wall 211 as it moves the bulk material 205, there may be a first tension member 252a. There may be other tension members, such as a second tension member 252b. The first tension member 252a may be positioned or otherwise proximate a front side of the wall 211, or the side in proximate contact with the bulk material 205. Placing tension on the wall 211 may help alleviate buckling or other negative friction results that may occur as the wall moves heavy loads of materials 205. The second tension member 252b may be positioned or otherwise proximate a back side of the wall 211, or the side in proximity of the backup portion 249.

Tension within the members 252 a, b may be from the result of a cable coupled with a turnbuckle that may be further coupled with the wall 211. As a bolt of the turnbuckle is tightened, more tension is added to the cable, and vice versa. Having a tension member 252 a, b on either side of the wall 211 may help ensure an approximate amount of equal tension may be distributed to the wall 211.

As illustrated by the Figures together (see also FIG. 1B), the movement of the wall 211 may be controlled by a powered assembly or system, such as a winch assembly 219. The winch assembly 219 may include a winch 216, a cable 218, a power supply/controller 253, and one or more pulleys 234. The winch 216 may include a first winch housing 254a and a second winch housing 254b. A spool 255 may be movingly (such as rotatably) coupled with the first and second winch housings 254 a, b.

Figure 2D:
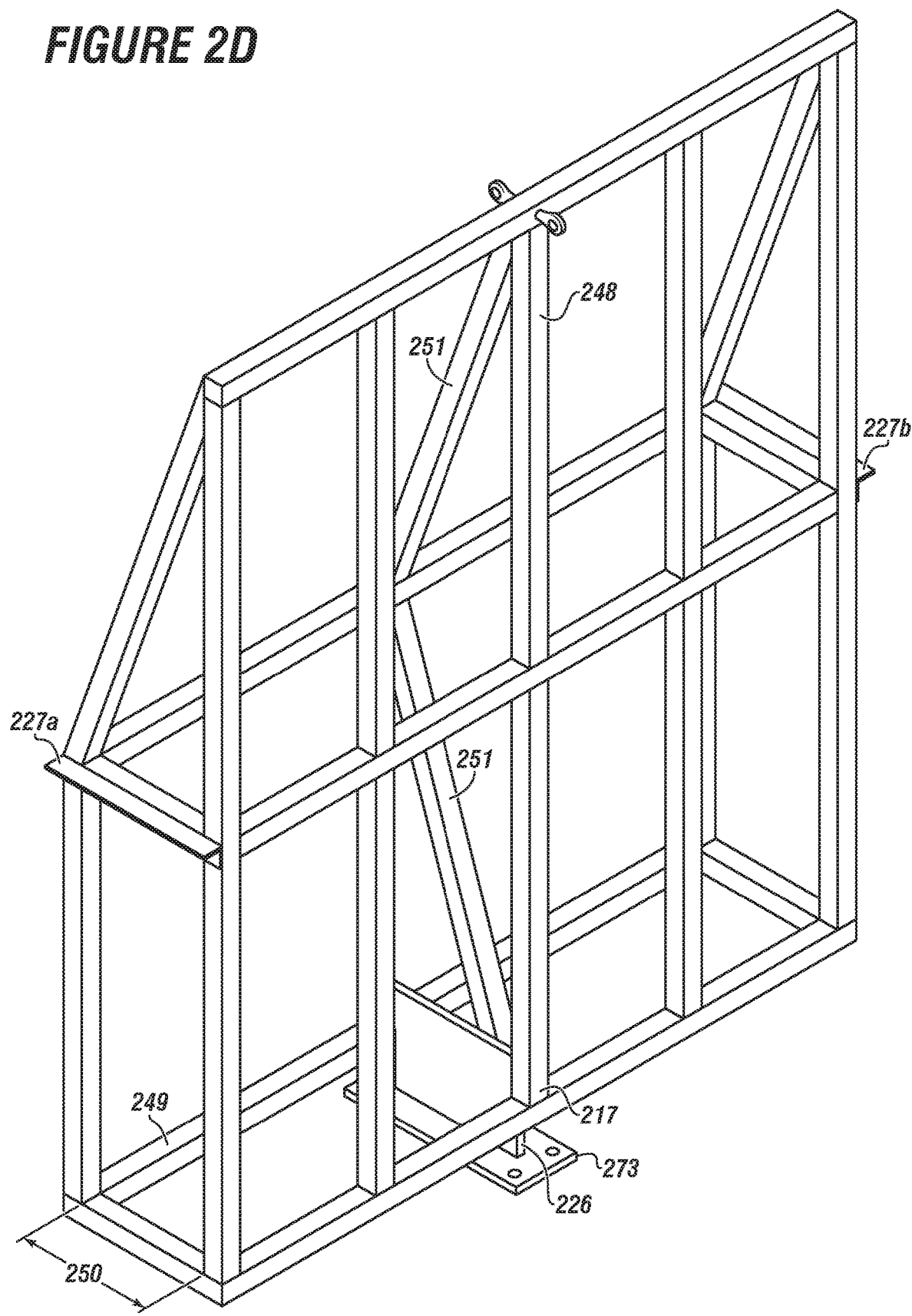
FIG. 2D shows a frontward isometric view of a movable wall for a powered trailer unit according to embodiments of the disclosure.
Figure 2E:
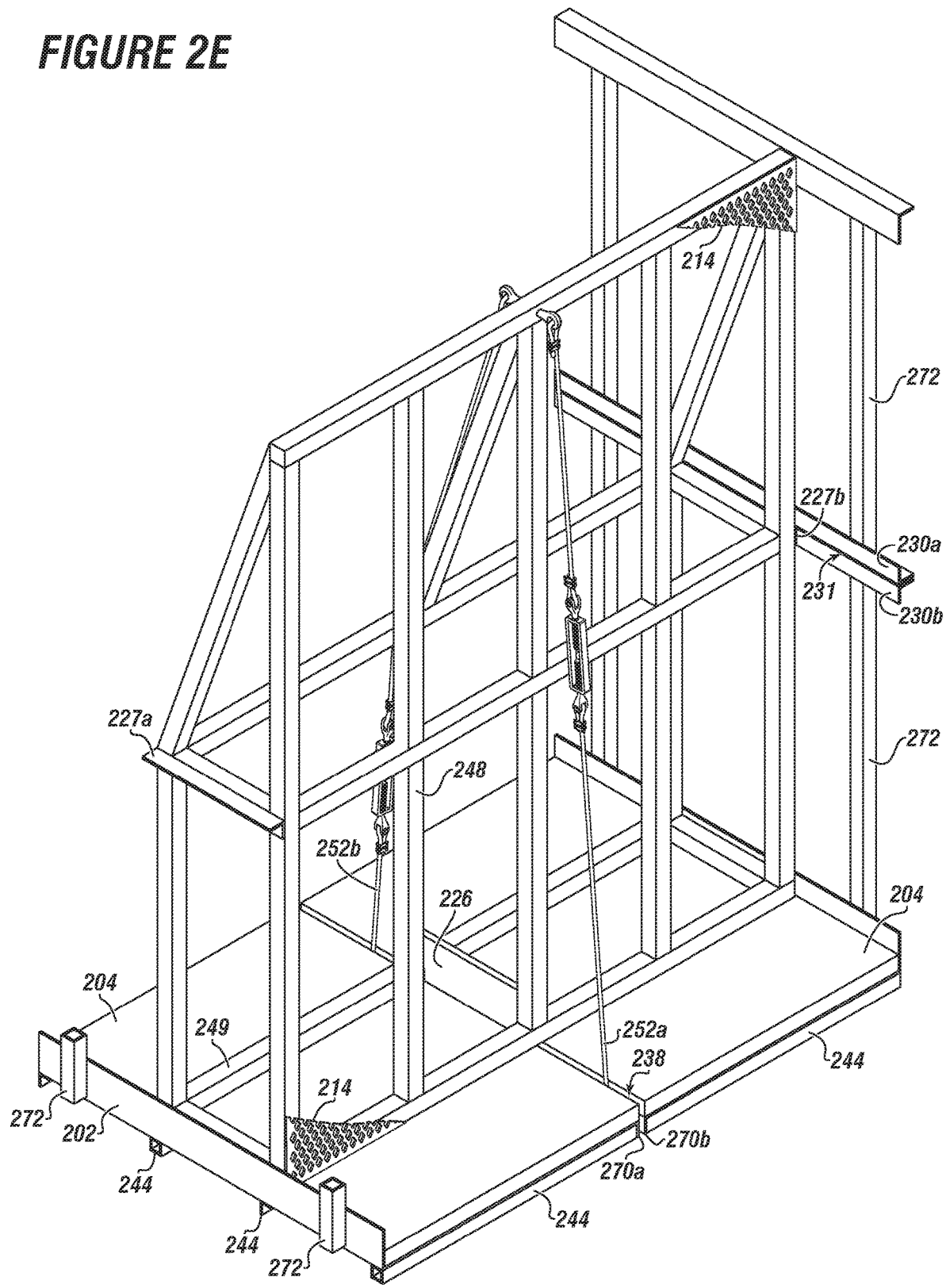
FIG. 2E shows a partial isometric view of a movable wall engaged with a side of a powered trailer unit according to embodiments of the disclosure.
Figure 2F:
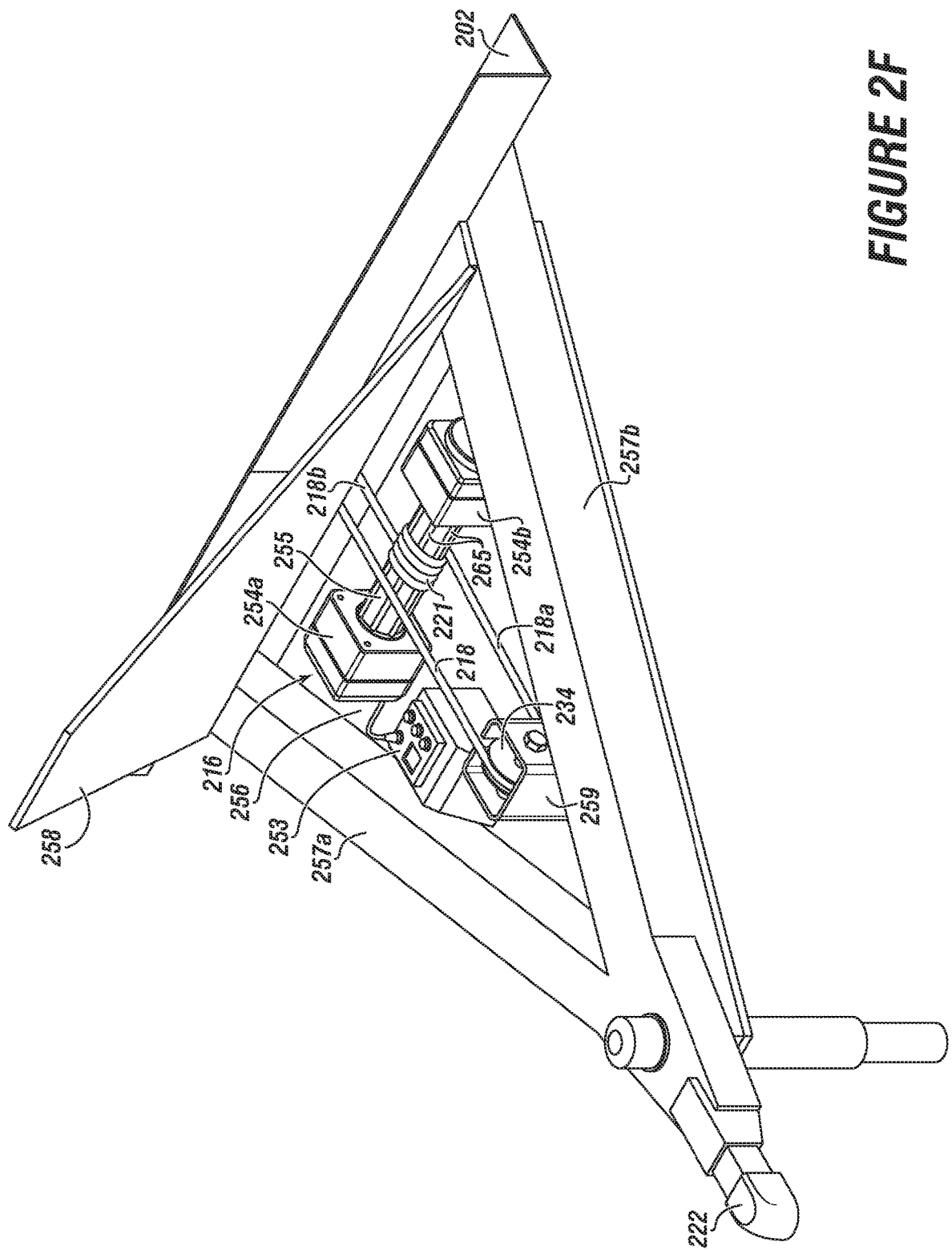
FIG. 2F shows a partial isometric view of a winch assembly for a powered trailer unit according to embodiments of the disclosure.
Figure 2I:
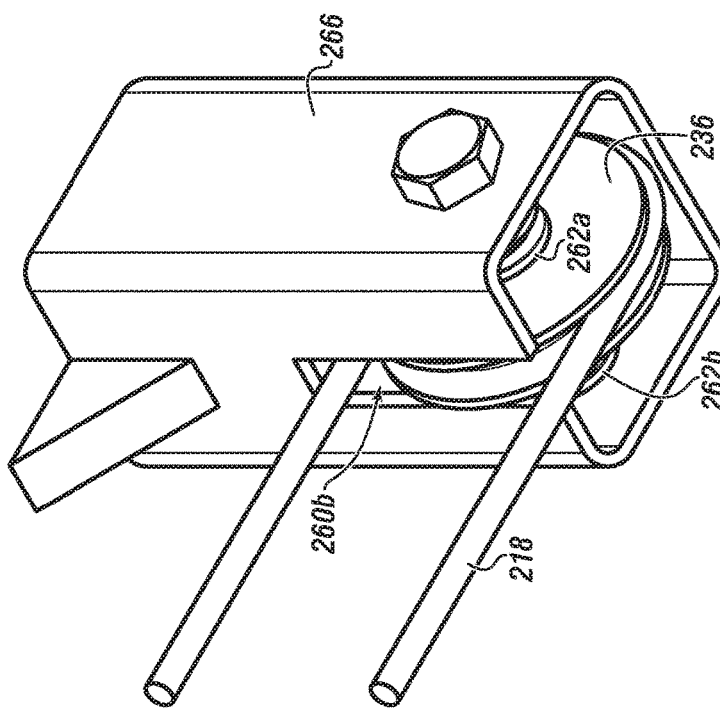
FIG. 2I shows an isometric view of part of a cable engaged with a pulley according to embodiments of the disclosure.
Figure 2G:
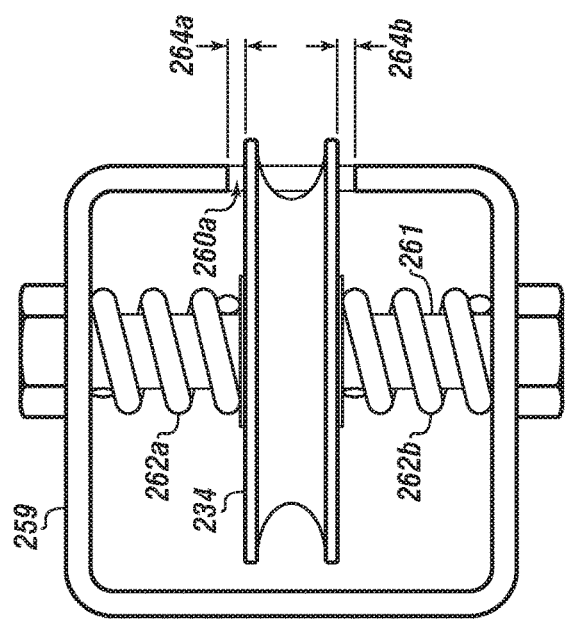
FIG. 2G shows a downward view of a pulley disposed in a pulley housing according to embodiments of the disclosure.
Figure 2H:
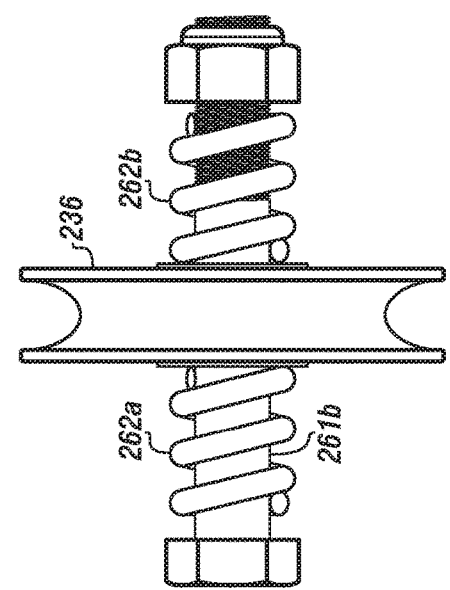
FIG. 2H shows a downward view of a pulley disposed around a pulley shaft according to embodiments of the disclosure.

A conventional spool for a winch may have multiple layers of cable wrap disposed therearound (i.e., as the cable wraps around the spool it wraps around itself); however, as shown in FIG. 2F, there may be a single wrap layer 221 of cable 218. That is, the cable 218 may not wrap around and on top of another portion of the cable 218; instead, the portion of the cable 218 wrapped around the spool 255 may be in direct contact with the spool 255. The layer 221 may have about 2 to 8 windings of the cable 218.

In operation of the unit 200, the location of the layer 221 around the spool 255 may change. That is, for example, as the wall 211 is extended or otherwise moved from end 210 toward end 212, a first portion 218a of the cable may unwrap from the spool 255, while a second portion 218b begins to wrap therearound. The may result in the pseudo appearance of the layer 221 moving laterally from one point to another along the spool 255, with the same being the case vice versa in reverse operation. How much the layer 221 moves may depend on how far the wall 211 may be moved. The first position of the wall 211 may be its fully retracted position furthest toward end 210. The second position of the wall 211 may be any intermediate position of the wall 211 as it is extended away from the first position toward the second end 212.

Other conveyance or movement mechanisms are possible, such as powered rollers, belts, and the like. As shown here, the winch assembly 219 may include a powered winch 216. The powered winch 216 may have a rope, cable, chain, etc. 218 wrapped around and engaged therewith. As one of skill would appreciate, in the general operation of winch 216, as the winch rotates, the cable 218 may be moved. The powered winch 216 may rotate in either direction. As such, the movement of the wall 211 may be bi-directional.

The cable 218 may wrap around one or more pulleys or rollers. As shown here, the cable 218 may form a loop by wrapping around a first pulley or roller 234, as well as a second pulley or roller 236. The first pulley 234 may be disposed on or in the vicinity of the proximate end 210. The second pulley 236 may be disposed on or in the vicinity of the distal end 212.

The first pulley 234, and other portions of the winch assembly 219 may be disposed on a winch support platform 256. The support platform 256 may be coupled with sidewalls 257 a, b. A cover 258 may also be coupled with the sidewalls 257 a, b. The cover 258 may be movingly (such as hingedly) coupled with one or more of the sidewalls 257 a, b. The sidewalls 257a and 257b may be part of or extend from the frame 202.

The first pulley 234 may be disposed, at least partially, within a first pulley housing 259. The first pulley housing 259 may be coupled with or integral to the support platform 256. A pulley shaft 261 may be disposed within the housing 259 in a manner whereby the pulley 234 may be movingly (e.g., rotatably) engaged therewith. The pulley 234 may extend, at least partially out of any of the housing openings 260a, 260b.

As mentioned, during operation of the winch 216, the layer of cable 221 may traverse the spool 255. This may have an impact on the pulley 234 by pulling it to one side or the other. To alleviate any such forces, impact springs 262a, 262b may be disposed around the shaft 261 on either side of the pulley 234. As such, when the layer 221 moves, the pulley 234 may be pulled toward one side of the housing or the other; however, the impact springs 262a, 262b may protect the pulley from bumping up or otherwise undesirably touching housing 259. As shown, there may be a first pulley clearance 264a on one side, and a second pulley clearance 264b on the other side.

To further benefit operation, the pulley 234 may be self-lubricating. For example, while not shown here, the shaft 261 may have a bore therethrough (horizontally) that may be filled with lubricant via nozzle 263. There may be another nozzle that opens to the shaft surface that may facilitate the spread of lubricant onto the shaft 261 and pulley 234.

The cable 218 may form a loop that wraps around each of the first pulley 234 and the second pulley 236. The second pulley 236 may be like that of the first pulley 234. The second pulley 236 may be disposed in, at least partially, a second pulley housing 266. The second pulley 236 may be movingly (such as rotatably) disposed around a second pulley shaft 268. The second pulley housing 266 may be disposed on a second pulley support platform 267. The support platform 267 may be coupled with the frame 202.

Ends of the cable 218 may engage with the lower fin 226. The lower fin 226 may (essentially) couple the powered motion of the winch 216 to the wall 211. As such, the cable 218 may be coupled with the lower fin 226, and the lower fin 226 may be coupled to (or be integral with) the wall 211, such as to a bottom 217 of the wall 211. FIG. 2J illustrates there may be a turnbuckle (or other suitable component) to which each of the cable ends connect too. The cable-turnbuckle configuration allows for tightening the cable and taking out any undesired slack. The turnbuckle 271 may be coupled to the lower fin 226.

Although not limited to any particular type of coupling, the cable may be disposed between a lower plate and an upper plate (the upper plate being part of the lower fin 226). Bolts or other suitable fasteners may be use to couple and tighten the plates together. To facilitate movement of the wall 211 and the lower fin 226, there may be a slot (or rail, cap, clearance, etc.) 238 disposed within the floor 204.

There may be a person or operator (not shown here) in the vicinity of the trailer unit 200 in order to control operation of the winch assembly 219. The operator may activate an on/off switch that powers the assembly 219. Then, the operator may activate a forward/reverse switch that subsequently results in movement of the wall 211. For example, when materials 205 are disposed in the unit 200 and are ready for removal, the operator may turn the winch assembly 219 on, move the wall 211 forward, and observe the wall 211 move and clear the materials 205 from the unit.

The control feature of the assembly 219 may also include a 'reverse' capability whereby the wall 211 may be moved in the opposite direction (e.g., from the second position toward the first position). The wall 211 may be also be moved manually. Although not shown here, there may be a clutch feature that allows easier manual movement of the wall 211. Operation to move the wall 211 may be via a controller or remote control. The assembly may be operably coupled with a power source, such as a battery of the assembly itself, or a vehicle (such as a truck used to haul the trailer unit 200).

The operator 220 may control operation of the winch assembly 219 at the winch 216, or via a control panel located elsewhere. The operation may be remote, such as wireless or infrared. The operator 220 may control operation through a mobile application, and thus may use a cell phone, tablet, PC, or other comparable device.

Either or both of the tension members may be coupled with the cable.

The spool 255 may include one or more friction elements 265 coupled therewith. The friction element(s) 265 may extend the length of the spool 255 from the first housing 254a to the second housing 254b. The friction element 265 may have a plurality of ridges thereon.

In a typical winch, the cable may layer or wrap upon itself and prevent or inhibit its own slippage; however, as shown here, there may only be a single wrap layer of cable. The one or more friction elements 265 may prevent slippage of the cable 218.

While preferred embodiments of the disclosure have been shown and described, modifications thereof may be made by one skilled in the art without departing from the spirit and teachings of the disclosure. The embodiments described herein are exemplary only and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A powered trailer unit for use in transport of bulk materials, the unit comprising:
    a support frame;
    a bed disposed on the support frame;
    a first side;
    a second side opposite the first side;
    a gate side near a distal end of the support frame;
    a movable wall near a proximate end of the support frame when the movable wall is in a first position;
    a first guide rail positioned on the first side, the movable wall movingly engaged therewith;
    a second guide rail positioned on the second side, the movable wall movingly engaged therewith;
    a winch assembly operatively engaged with the movable wall, the winch assembly comprising:
        a powered winch;
        a first pulley;
        a second pulley;
        and a cable movingly engaged with the powered winch, the first pulley, the second pulley, and the movable wall,
    wherein the movable wall is configured to be moved back and forth between the first position and a second position by operation of the winch assembly,
    wherein the first pulley is movably disposed around a first pulley shaft that is coupled with a first pulley housing, and
    wherein shaft springs are disposed around the shaft on each side of the first pulley.

2. The powered trailer unit of claim 1, wherein the bed comprises a longitudinal slot, wherein the movable wall comprises a lower skate movingly disposed within the longitudinal slot, the lower skate having a first skate portion disposed above the bed, and a second skate portion disposed below the bed, and wherein the cable is coupled with the second skate portion.

3. The powered trailer unit of claim 1, the movable wall comprising a front vertical portion, and a backup portion coupled therewith, wherein a first tension member is coupled with the front vertical portion and the cable, and a second tension member is coupled with the backup portion and the cable.

4. The powered trailer unit of claim 1, wherein the movable wall comprises a first side fin disposed on a first wall side, and a second side fin disposed on a second wall side, and wherein the first side fin is movingly engaged with the first guide rail, and the second side fin is movingly engaged with the second guide rail.

5. A powered trailer unit for use in transport of bulk materials, the unit comprising:
  a support frame;
  a bed disposed on the support frame, the bed comprising a longitudinal slot;
  a barrier disposed around a perimeter of the support frame, the barrier comprising: a first side, a second side opposite the first side, a gate side, and a movable wall;
  a first guide rail positioned on the first side, the movable wall movingly engaged therewith;
  a second guide rail is disposed on the second side, and the movable wall is movingly engaged therewith;
  a mover operatively engaged with the movable wall, the mover comprising:
    a powered winch that is part of a winch assembly, wherein the winch assembly further comprises:
      a first pulley disposed on a first support plate near a proximate end of the support frame;
      a second pulley disposed on and underneath a second support plate near a distal end of the support frame;
      a cable movingly engaged with the powered winch, the first pulley, the second pulley, and the second skate portion
  wherein the movable wall is configured to be moved back and forth along the unit by operation of the mover,
  wherein the movable wall comprises a lower skate movingly disposed within the longitudinal slot, the lower skate having a first skate portion disposed above the bed, and a second skate portion disposed below the bed,
  wherein the cable is wrapped around a spool of the powered winch in a single layer comprising 2 to 8 windings in a manner that forms a cable wrap layer,
  wherein the cable wrap layer moves laterally along the spool as the movable wall moves from a first position to a second position,
  wherein the first pulley is movably disposed around a first pulley shaft that is coupled with a first pulley housing, and wherein shaft springs are disposed around the shaft on each side of the first pulley.

6. The powered trailer unit of claim 5, the movable wall comprising a front vertical portion, and a backup portion coupled therewith.

7. The powered trailer unit of claim 6, wherein a first tension member is engaged with the front vertical portion, and a second tension member is engaged with the backup portion.

8. The powered trailer unit of claim 5, wherein the movable wall comprises a first side fin disposed on a first wall side, and a second side fin disposed on a second wall side.

9. The powered trailer unit of claim 8, wherein the first side fin is movingly engaged with the first guide rail, and the second side fin is movingly engaged with the second guide rail.

10. The powered trailer unit of claim 9, wherein the bed has a support rib coupled therewith, and wherein the support rib is configured with a clearance.

11. A powered trailer unit for use in transport of bulk materials, the unit comprising:
  a support frame;
  a bed disposed on the support frame, the bed further comprising a longitudinal slot;
  a barrier disposed around a perimeter of the support frame, the barrier comprising: a first side, a second side opposite the first side, a gate side, and a movable wall that further comprises:
    a lower skate movingly disposed within the longitudinal slot, the lower skate having a first skate portion disposed above the bed, and a second skate portion disposed below the bed;
  a first guide rail disposed on the first side, the movable wall movingly engaged therewith;
  a second guide rail disposed on the second side, the movable wall also movingly engaged therewith;
  a powered winch assembly operatively engaged with the movable wall, the powered winch assembly further comprising:
    a first pulley disposed on a first support plate near a proximate end of the support frame;
    a second pulley disposed on a second support plate near a distal end of the support frame; and
    a cable movingly engaged with the first pulley, the second pulley, and the second skate portion;
  wherein the movable wall is configured to be moved back and forth along the unit by operation of the mover,
  wherein the cable is wrapped around a spool of the powered winch assembly in a manner that forms a cable wrap layer that moves along the spool as the movable wall moves from a first position to a second position,
  wherein the first pulley is movably disposed around a first pulley shaft, and
  wherein shaft springs are disposed around the first pulley shaft on each side of the first pulley.

12. The powered trailer unit of claim 11, the movable wall comprising a front vertical portion, and a backup portion coupled therewith.

13. The powered trailer unit of claim 12, wherein a first tension member is engaged with the front vertical portion, and a second tension member is engaged with the backup portion.

14. The powered trailer unit of claim 11, wherein the movable wall comprises a first side fin disposed on a first wall side, and a second side fin disposed on a second wall side, and wherein the first side fin is movingly engaged with the first guide rail, and the second side fin is movingly engaged with the second guide rail.

15. The powered trailer unit of claim 4, wherein the bed has a support rib coupled therewith, and wherein the support rib is configured with a clearance.

* * * * *